United States Patent
Park et al.

(10) Patent No.: US 10,609,608 B2
(45) Date of Patent: Mar. 31, 2020

(54) METHOD FOR CHANGING CONNECTION MODE IN BASE STATION, AND BASE STATION THEREFOR, AND METHOD FOR CHANGING CONNECTION MODE IN USER EQUIPMENT, AND USER EQUIPMENT THEREOF

(71) Applicant: LG ELECTRONICS INC., Seoul (KR)

(72) Inventors: Sangmin Park, Seoul (KR); Jinsook Ryu, Seoul (KR); Jaehyun Kim, Seoul (KR); Taehun Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

(21) Appl. No.: 16/087,616

(22) PCT Filed: Mar. 23, 2017

(86) PCT No.: PCT/KR2017/003149
§ 371 (c)(1),
(2) Date: Sep. 21, 2018

(87) PCT Pub. No.: WO2017/164674
PCT Pub. Date: Sep. 28, 2017

(65) Prior Publication Data
US 2019/0104455 A1  Apr. 4, 2019

Related U.S. Application Data

(60) Provisional application No. 62/312,447, filed on Mar. 23, 2016, provisional application No. 62/405,999, filed on Oct. 10, 2016.

(51) Int. Cl.
*H04W 36/06* (2009.01)
*H04W 76/30* (2018.01)
(Continued)

(52) U.S. Cl.
CPC ....... *H04W 36/06* (2013.01); *H04W 36/0022* (2013.01); *H04W 76/19* (2018.02); *H04W 76/20* (2018.02); *H04W 76/30* (2018.02)

(58) Field of Classification Search
None
See application file for complete search history.

(56) References Cited

U.S. PATENT DOCUMENTS

| 2015/0043492 A1 | 2/2015 | Baek et al. |
| 2018/0109941 A1* | 4/2018 | Jain .................. H04W 60/00 |

FOREIGN PATENT DOCUMENTS

| KR | 100617730 | 8/2006 |
| KR | 101393669 | 5/2014 |
| WO | 2015046957 | 4/2015 |

OTHER PUBLICATIONS

PCT International Application No. PCT/KR2017/003149, Written Opinion of the International Searching Authority dated May 24, 2017, 20 pages.

(Continued)

*Primary Examiner* — Christine T Duong
(74) *Attorney, Agent, or Firm* — Lee, Hong, Degerman, Kang & Waimey PC

(57) ABSTRACT

A network may instruct to change the connection of a user equipment connected to the network in a first mode, to a second mode. The network may instruct re-establishment while instructing the user equipment to change the connection. In this case, the network and the user equipment release the connection of the first mode while maintaining an uplink resource allocated to the user equipment. After completing the connection release, the user equipment may transmit a connection request to the network using the uplink resource directly without any access process.

20 Claims, 12 Drawing Sheets

(51) Int. Cl.
*H04W 76/20* (2018.01)
*H04W 76/19* (2018.01)
*H04W 36/00* (2009.01)

(56) References Cited

OTHER PUBLICATIONS

3rd Generation Partnership Project (3GPP), "Technical Specification Group Radio Access Network; Evolved Universal Terrestrial Radio Access (E-UTRA); Radio Resource Control (RRC); Protocol specification (Release 13)," 3GPP TS 36.331 V13.0.0, Dec. 2015, 507 pages.

3rd Generation Partnership Project (3GPP), "Technical Specification Group Radio Access Network; Evolved Universal Terrestrial Radio Access (E-UTRA); Radio Resource Control (RRC); Protocol specification (Release 14)," 3GPP TS 36.331 V14.1.0, Jan. 2016, 654 pages.

* cited by examiner

FIG. 5
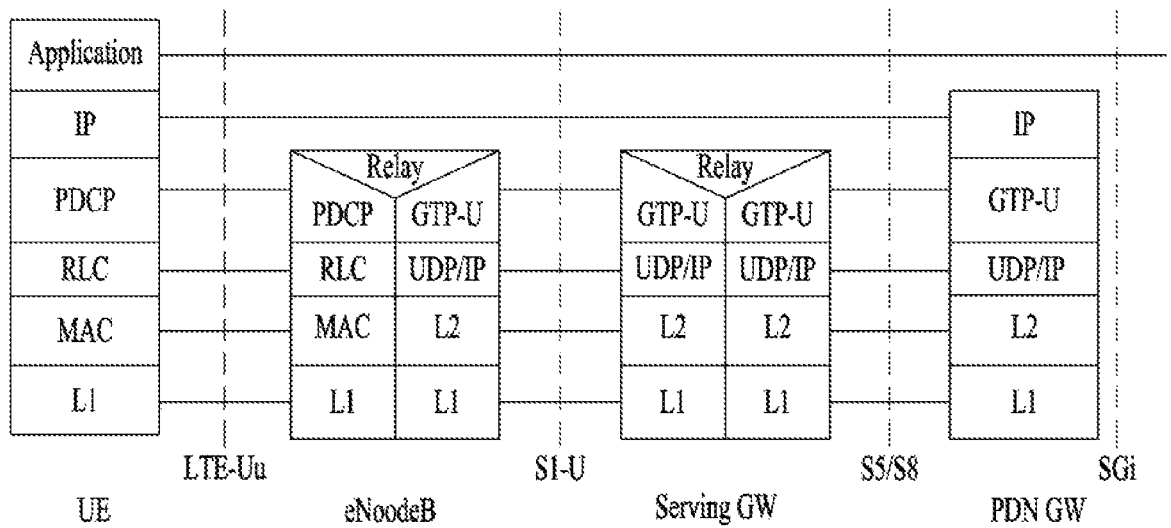
(a) UE-P-GW user plane with E-UTRAN
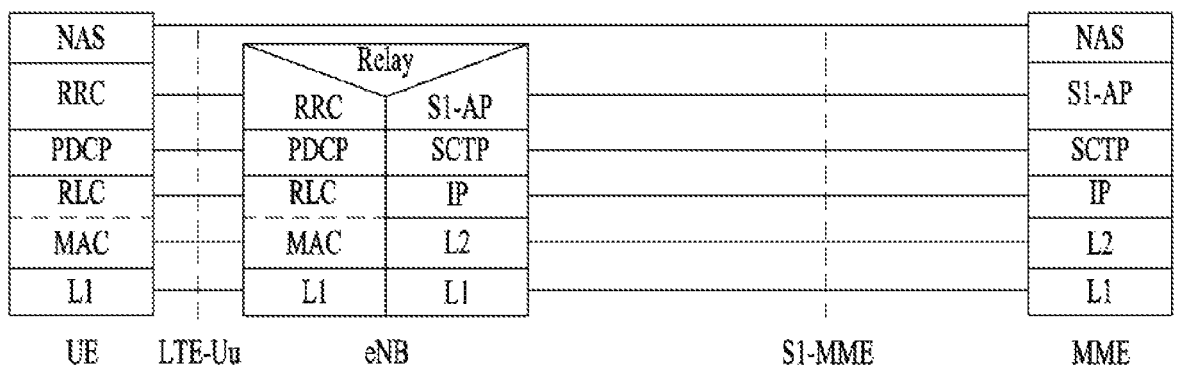
(b) Control Plane UE-MME

METHOD FOR CHANGING CONNECTION MODE IN BASE STATION, AND BASE STATION THEREFOR, AND METHOD FOR CHANGING CONNECTION MODE IN USER EQUIPMENT, AND USER EQUIPMENT THEREOF

CROSS-REFERENCE TO RELATED APPLICATIONS

This application is the National Stage filing under 35 U.S.C. 371 of International Application No. PCT/KR2017/003149, filed on Mar. 23, 2017, which claims the benefit of U.S. Provisional Application Nos. 62/312,447, filed on Mar. 23, 2016, and 62/405,999, filed on Oct. 10, 2016, the contents of which are all hereby incorporated by reference herein in their entirety.

TECHNICAL FIELD

The present invention relates to a wireless communication system and, more particularly, to a method and apparatus for changing a connection mode.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication. Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With the development of smart devices, a new method for efficiently transmitting/receiving a small amount of data or infrequently occurring data is required.

In addition, with the introduction of a new connection mode/type or a new network function, a method of rapidly changing a connection mode/type between a network and a UE without affecting other systems or with a minimum effect on other systems is needed.

The technical objects that can be achieved through the present invention are not limited to what has been particularly described hereinabove and other technical objects not described herein will be more clearly understood by persons skilled in the art from the following detailed description.

Technical Solution

A network may command that a connection of a UE connected to the network in a first mode be changed to be in a second mode. The network may command that the connection be re-established while commanding the UE to change the connection. In this case, the network and the UE release the connection of the first mode while maintaining an uplink resource allocated to the user equipment. After completing connection release, the UE may transmit a connection request to the network using the uplink resource without a random access procedure.

According to an aspect of the present invention, provided herein is a method of changing a connection mode by a base station (BS). The method may include: receiving a connection re-establishment indication together with a connection release command for a user equipment (UE) from a core network; transmitting a connection release message including information on the connection re-establishment indication to the user equipment having a connection of a first mode; releasing the connection of the first mode from the UE while maintaining an uplink resource allocated to the UE; and receiving a connection request through the uplink resource without a random access procedure after releasing the connection of the first mode.

According to another aspect of the present invention, provided herein is a base station (BS) for changing a connection mode. The BS includes a transceiver, and a processor configured to control the transceiver. The processor may: control the transceiver to receive a connection re-establishment indication together with a connection release command for a user equipment (UE) from a core network; control the transceiver to transmit a connection release message including information on the connection re-establishment indication to the UE having a connection of a first mode; release the connection of the first mode from the UE while maintaining an uplink resource allocated to the UE; and control the transceiver to receive a connection request through the uplink resource without a random access procedure after releasing the connection of the first mode.

According to another aspect of the present invention, provided herein is a method of changing a connection mode by a user equipment (UE). The method may include: receiving a connection release message including information on a connection re-establishment indication from a network through a connection of a first mode; releasing the connection of the first mode while maintaining an uplink resource allocated to the UE; and transmitting a connection request to the network through the uplink resource without a random access procedure after releasing the connection of the first mode.

According to another aspect of the present invention, provided herein is a user equipment (UE) for changing a connection mode. The UE includes a transceiver, and a processor configured to control the transceiver. The processor may: control the transceiver to receive a connection release message including information on a connection re-establishment indication from a network through a connection of a first mode; release the connection of the first mode while maintaining an uplink resource allocated to the UE; and control the transceiver to transmit a connection request to the network through the uplink resource without a random access procedure after releasing the connection of the first mode.

In each aspect of the present invention, the UE and the BS may establish a connection of a second mode different from the first mode.

In each aspect of the present invention, the connection release message may be for changing a network slice. The first mode and the second mode may be different network slices.

In each aspect of the present invention, the connection release message may be for changing a cellular Internet of things (CIoT) optimization mode. The first mode may be a control plane CIoT optimization mode. The second mode may be a user plane CIoT optimization mode.

In each aspect of the present invention, the connection release message may include allocation information on the uplink resource.

The above technical solutions are merely some parts of examples of the present invention and various examples into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to the present invention, a low-complexity/low-cost UE can communicate with the network while maintaining backward compatibility with the legacy system.

According to the present invention, a UE can be implemented with low complexity/low cost.

According to the present invention, a UE can communicate with the network in narrowband.

According to the present invention, a small amount of data can be efficiently transmitted/received.

According to the present invention, a connection mode or type between a UE and a network can be rapidly changed.

According to the present invention, a slice reselection procedure can be rapidly performed while applying network slicing.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate examples of the invention and together with the description serve to explain the principle of the invention.

FIG. 5 is a diagram illustrating LTE (Long Term Evolution) protocol stacks for a user plane and a control plane.

MODE FOR INVENTION

Figure 1:
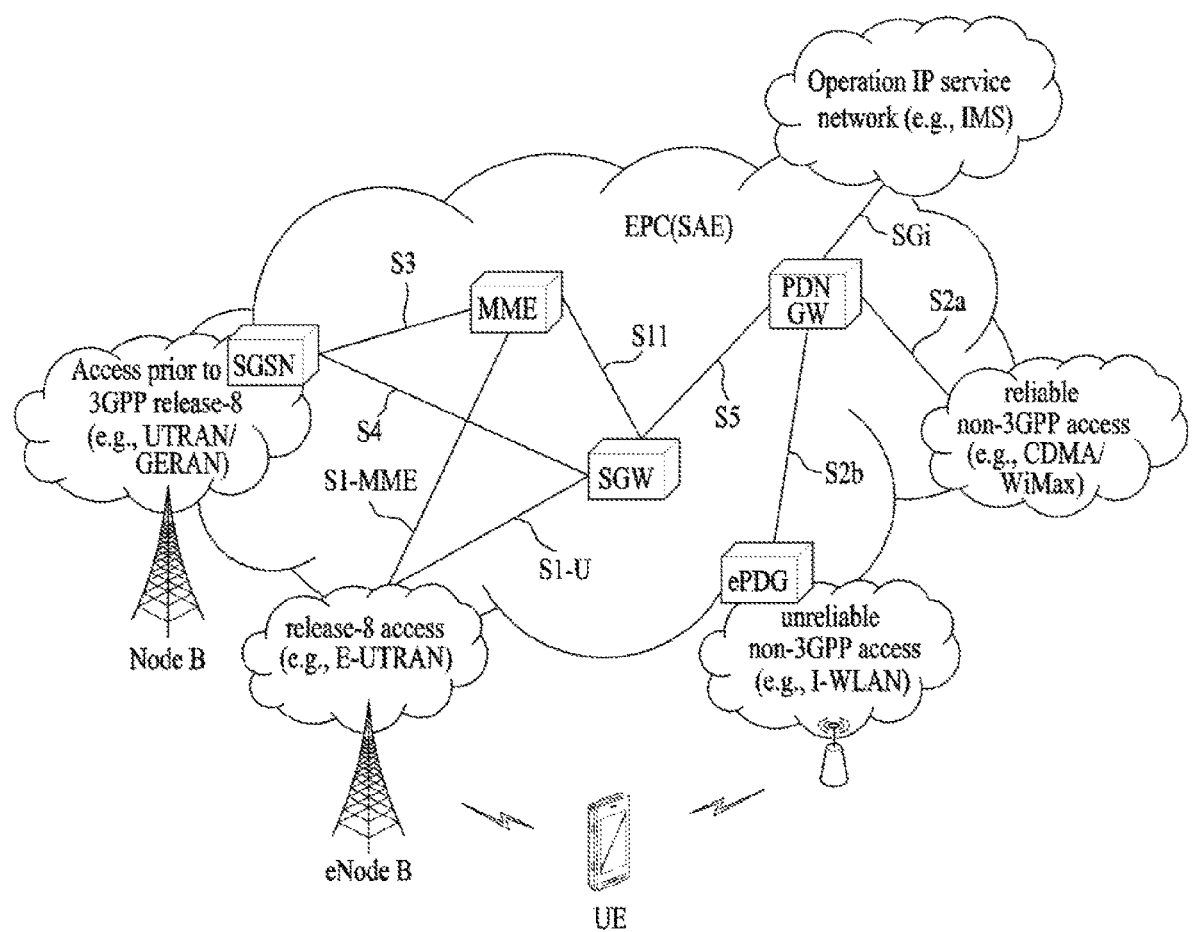
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The examples of the present invention described hereinbelow are combinations of elements and features of the present invention. The elements or features may be considered selective unless mentioned otherwise. Each element or feature may be practiced without being combined with other elements or features. Further, an example of the present invention may be constructed by combining parts of the elements and/or features. Operation orders described in examples of the present invention may be rearranged. Some constructions or features of any one example may be included in another example and may be replaced with corresponding constructions or features of another example.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The examples of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, one or more of standard specifications, such as 3GPP TS 36.211, 3GPP TS 36.213, 3GPP TS 36.321, 3GPP TS 36.322, 3GPP TS 36.323, 3GPP TS 36.331, 3GPP TS 23.401, 3GPP TS 24.301, 3GPP TS 23.228, 3GPP TS 29.228, 3GPP TS 23.218, 3GPP TS 22.011, and 3GPP TS 36.413 may be referenced.

Reference will now be made in detail to the examples of the present disclosure with reference to the accompanying drawings. The detailed description, which will be given below with reference to the accompanying drawings, is intended to explain exemplary examples of the present disclosure, rather than to show the only examples that can be implemented according to the invention.

Specific terms used for the examples of the present invention are provided to aid in understanding of the present invention. These specific terms may be replaced with other terms within the scope and spirit of the present invention.

The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

generation, LTE_IDLE state management, ciphering of the user plane, SAE bearer control, and ciphering and integrity protection of NAS signaling.

Figure 3:
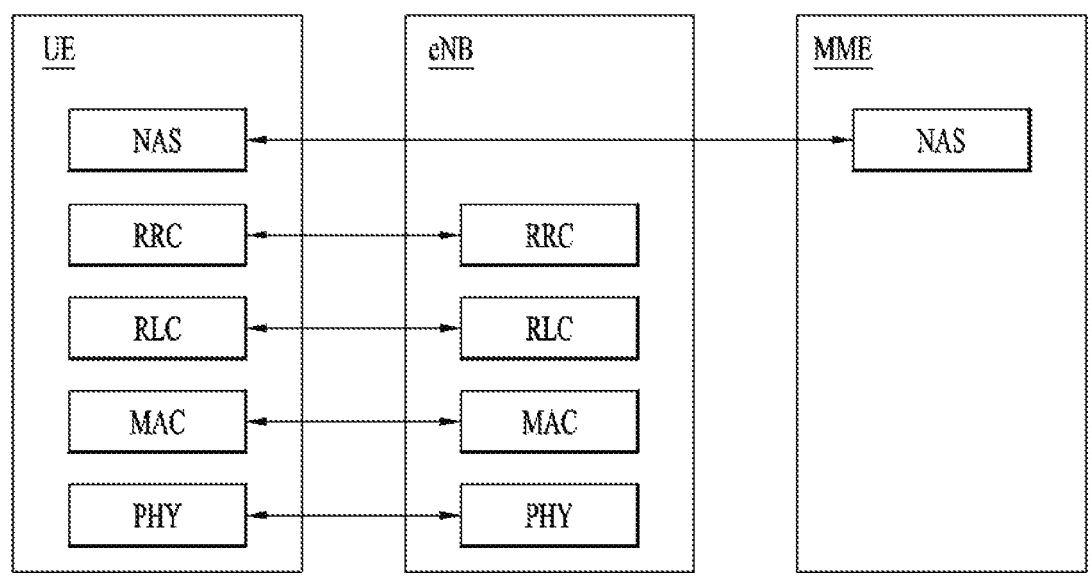
FIG. 3 is a diagram exemplarily illustrating the structure of a radio interface protocol in a control plane.
Figure 4:
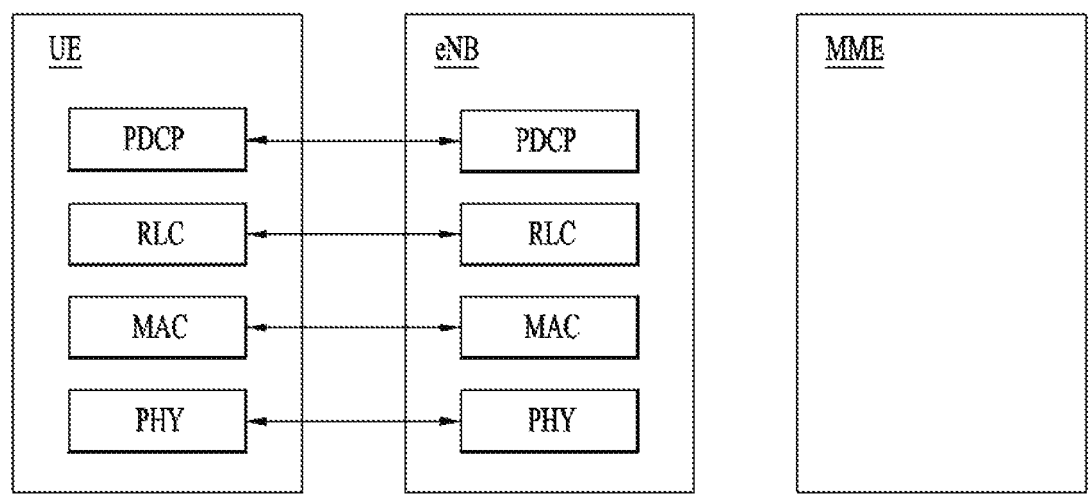
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
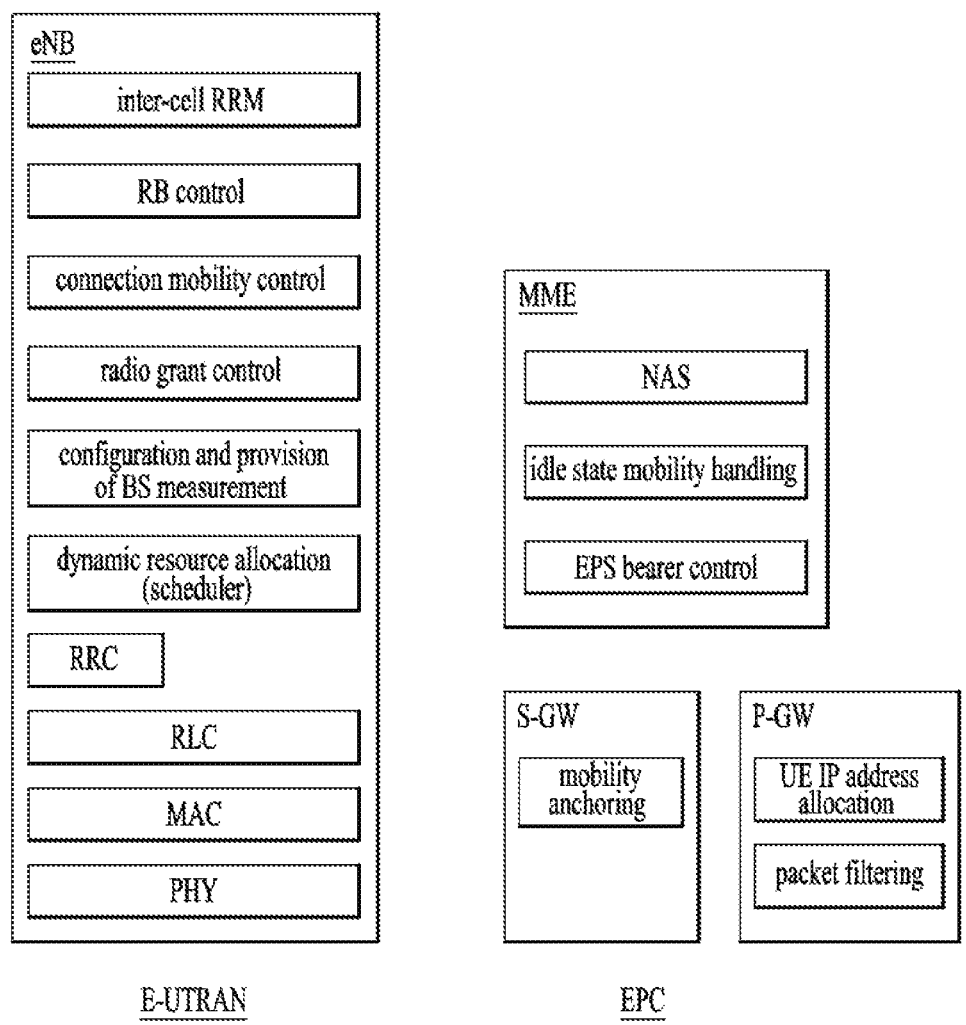
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

The RBs are broadly categorized into (user) data radio bearers (DRBs) and signaling radio bearers (SRBs). The SRBs are defined as RBs used only for transmission of RRC and NAS messages.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
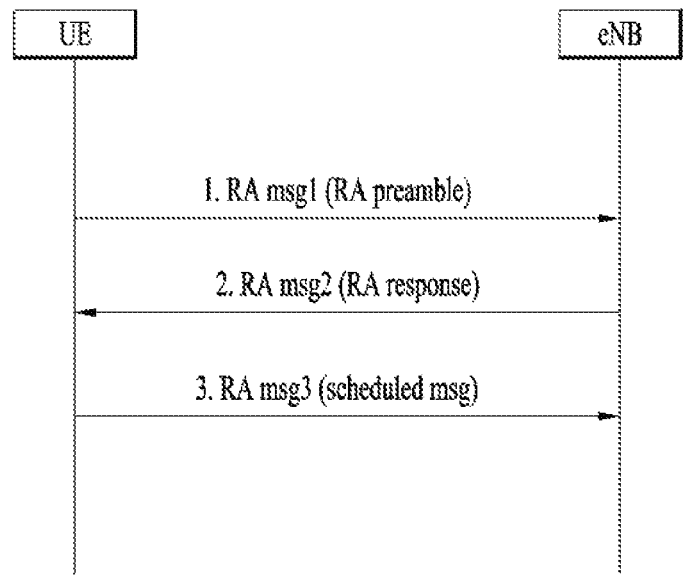
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.
2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).
3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
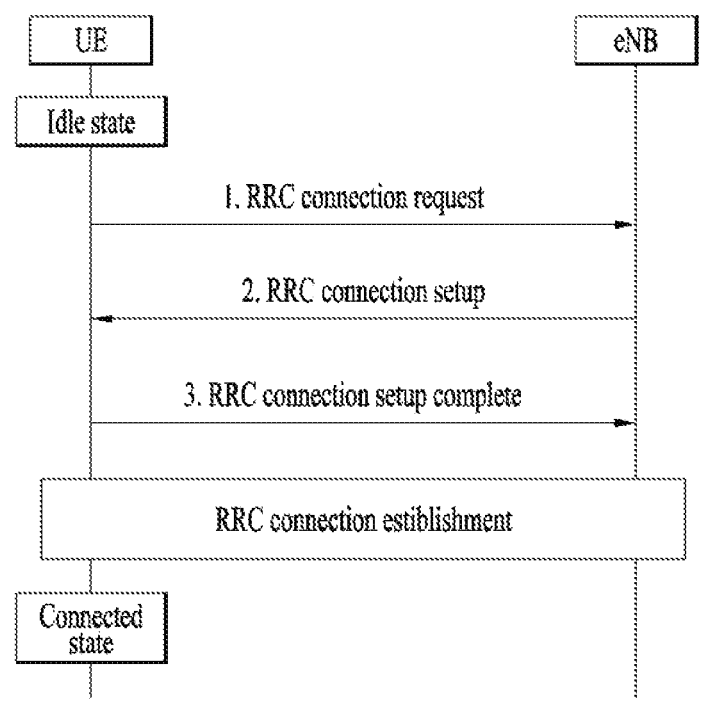
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.
2. Upon receiving the RRC connection request message from the UE, the eNB accepts the RRC connection request of the UE when the radio resources are sufficient, and then transmits an RRC connection setup message, which is a response message, to the UE.
3. Upon receiving the RRC connection setup message, the UE transmits an RRC connection setup complete message to the eNB.

When new traffic occurs, the UE in an idle state performs a service request procedure to transition to an activation state in which the UE can transmit/receive traffic. When an S1 connection is released and radio resources are not allocated to the UE due to traffic deactivation although the UE is registered in the network, i.e., when the UE is in an ECM-Idle state although the UE is in an EMM-Registered state, if traffic that the UE needs to transmit or the network needs to transmit to the UE occurs, the UE transmits a service request to the network. Upon successfully completing the service request procedure, the UE transitions to an ECM-Connected state and establishes an ECM connection (i.e., RRC connection+S1 signaling connection) in a control plane and an E-RAB (i.e., DRB and S1 bearer) in a user plane, thereby transmitting/receiving traffic. When the network desires to transmit traffic to the UE which is in the ECM-Idle state, the network transmits a paging message to the UE to announce that there is traffic to be transmitted, so that the UE may perform the service request procedure.

The network triggered service request procedure will now be described in brief. When downlink data that an MME is to transmit to the UE in the ECM-Idle state occurs or signaling therefor is needed, for example, when the MME needs to perform an MME/HSS-initiated detach procedure for the ECM-Idle mode UE or an S-GW receives control signaling (e.g. Create Bearer Request or Modify Bearer Request), the MME initiates the network triggered service request procedure. If an idle mode signaling reduction (ISR) function is activated, when the S-GW receives the Create Bearer Request or Modify Bearer Request for the UE, and if the S-GW does not have a downlink S1-U and the SGSN has notified the S-GW that the UE has moved to a PMM-Idle or Standby state, the S-GW buffers signaling messages and transmits a Downlink Data Notification to trigger the MME and SGSN to page the UE. If the S-GW, while waiting for the user plane to be established, is triggered to send a second Downlink Data Notification for a bearer with higher priority (i.e., allocation and retention priority (ARP) level) than a bearer on which the first Downlink Data Notification has been sent, the S-GW sends a new Downlink Data Notification message indicating the higher priority to the MME. If the S-GW receives additional downlink data packets for a bearer with the same or higher priority as or than the bearer on which the first Downlink Data Notification message has been sent, or if the S-GW has sent the second Downlink Data Notification message indicating the higher priority and receives additional downlink data packets for this UE, the S-GW buffers these downlink data packets and does not send the new Downlink Data Notification. The S-GW will be notified about a current RAT type based on a UE triggered service request procedure. The S-GW will keep executing a dedicated bearer activation or dedicated bearer modification procedure. That is, the S-GW will send corresponding buffered signaling to the MME or SGSN where the UE currently resides and inform a P-GW of the current RAT type if the RAT type has been changed compared to the last reported RAT type. If dynamic policy and charging control (PCC) is deployed, information about the current RAT type is conveyed from the P-GW to a PCRF. If the PCRF leads to EPS bearer modification as a response, the P-GW initiates a bearer update procedure. Upon sending the Downlink Data Notification, the S-GW includes both an EPS bearer ID and ARP in the Downlink Data Notification. If the Downlink Data Notification is triggered by the arrival of downlink data packets at the S-GW, in the Downlink Data Notification, the S-GW includes the EPS bearer ID and ARP associated with a bearer on which the downlink data packets have been received. If the Downlink Data Notification is triggered by the arrival of control signaling, in the Downlink Data Notification, the S-GW includes the EPS bearer ID and ARP if present in the control signaling. If the ARP is not present in the control signaling, the S-GW includes the ARP in a stored EPS bearer context. When a local gateway (L-GW) receives downlink data for the UE in the ECM-Idle state, if an LIPA PDN connection exists, the L-GW sends the first downlink user packet to the S-GW and buffers all other downlink user packets. The S-GW triggers the MME to page the UE. Details of the network triggered service request procedure may be found in section 5.3.4.3 of 3GPP TS 23.401.

Meanwhile, the UE with traffic to be transmitted transmits an RRC connection request to the eNB through the random access procedure including steps 1) to 3) of FIG. 7. Upon accepting the RRC connection request transmitted by the UE, the eNB transmits an RRC connection setup message to the UE. Upon receipt of the RRC connection setup message, the UE transmits an RRC connection setup complete message including a service request to the eNB. Details of the UE triggered service request procedure may be found in Section 5.3.4.1 of 3GPP TS 23.401.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) according to data transmission rate. Since the MTC UE has low mobility, the channel environment thereof remains substantially the same. If an MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, a legacy UE).

It is expected that a number of devices will be wirelessly connected to each other through the Internet of Things (IoT). The IoT means internetworking of physical devices, connected devices, smart devices, buildings, and other items with electronics, software, sensors, actuators, and network connectivity that enable these objects to collect and exchange data. In other words, the IoT refers to a network of physical objects, machines, people, and other devices that enable connectivity and communication for the purpose of exchanging data for intelligent applications and services. The IoT allows objects to be sensed and controlled remotely through existing network infrastructures, thereby providing opportunities for the direct integration between the physical and digital worlds, which result in improving efficiency, accuracy and economic benefits. Particularly, in the present invention, the IoT using the 3GPP technology is referred to as cellular IoT (CIoT). In addition, the CIoT that transmits/receives IoT signals using a narrowband (e.g., a frequency band of about 200 kHz) is called NB-IoT.

The CIoT is used to monitor traffic transmitted over a relatively long period, e.g., from a few decades to a year (e.g., smoke alarm detection, power failure notification from smart meters, tamper notification, smart utility (gas/water/electricity) metering reports, software patches/updates, etc.) and support UT' devices characterized as ultra-low complexity, power limitation and low data rates.

In the prior art, a connection with the network should be established for transmitting data to a UE in EMM-Idle mode. To this end, the UE should successfully complete the service request procedure illustrated in FIG. 8, but it is not suitable for the CIoT that requires optimized power consumption for the low data rate. To transmit data to an application, two types of optimization: User Plane CIoT EPS optimization and Control Plane CIoT EPS optimization has been defined for the CIoT in the EPS.

The User Plane CIoT EPS optimization and Control Plane CIoT optimization can be referred to U-plane CIoT EPS optimization and C-plane CIoT EPS optimization, respectively.

The Control Plane CIoT EPS optimization is signaling optimization capable of efficient transport of user data (IP or non-IP or SMS) on the control plane. In the case of a Control Plane CIoT EPS optimization solution, there is no setup data radio bearer, but data packets are transmitted on signaling radio bearer(s). In other words, unlike legacy data transmission in which data is transmitted via a path of UE-eNB-SGW by setting up a DRB after transitioning to an idle-to-connected mode, Control Plane CIoT EPS optimization uses a method of loading up a data PDU in a NAS message to be transferred through an SRB. For Control Plane CIoT EPS optimization, the NAS message for data transport and a (GTP-U based) S11-U, which is a new interface for data transport between the MME and the SGW, are defined. In Control Plane CIoT EPS optimization, a connection of a newly defined path of UE-eNB-MME-SGW is defined as a PDN connection although an existing DRB is not used, a state in which the SRB is set up to be able to transport data is also defined as a connected mode/state, and an S1 release procedure is performed after transport of the data. Notably, unlike a legacy S1 release procedure for releasing an S1-U interface (refer to Section 5.3.5 of 3GPP TS 23.401), in Control Plane CIoT EPS optimization, the S11-U interface, rather than the S1-U interface, is released through an S1 release procedure.

Meanwhile, Data Plane CIoT EPS optimization releases an RRC connection during a connected-to-idle mode transition with the goal of reducing signaling during an idle-to-connected mode transition for data transmission. Herein, Data Plane CIoT optimization defines a suspended state in which the eNB keeps the context of the UE without deleting the same unlike a legacy idle mode in which the eNB release the RRC connection and deletes a context of the UE during a connected-to-idle mode transition, a connection suspend procedure in which the eNB enters the suspended state, and a connection resume procedure in which the eNB transitions again to a connected mode from the suspended state. Although Data Plane CIoT EPS optimization needs to transfer data through an existing DRB, that is, the S1-U, access stratum (AS) parameters are cached in the eNB even during a connected-to-idle mode transition of the UE.

Figure 8:
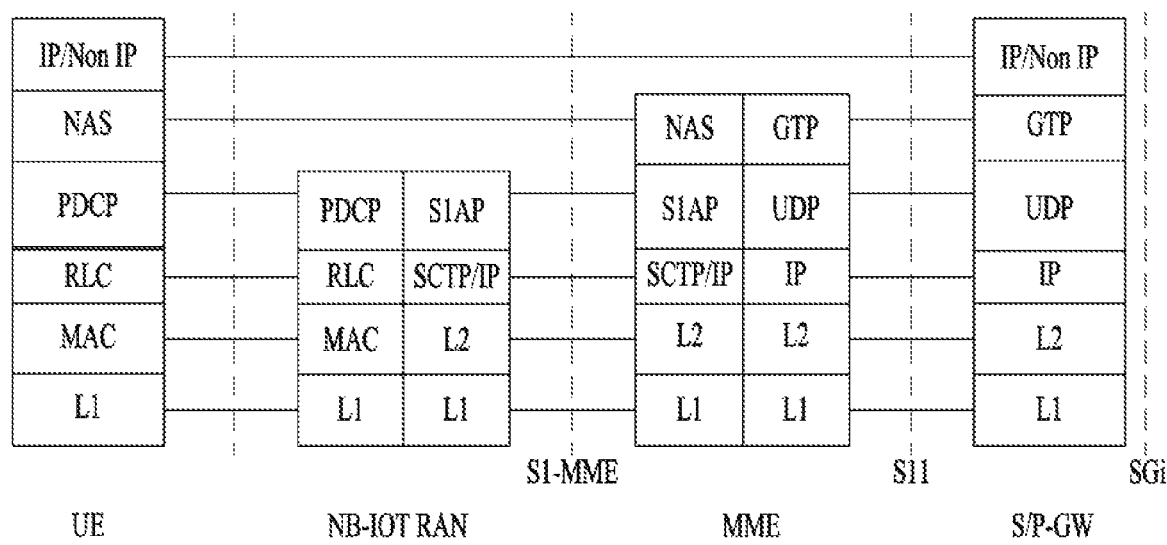
FIG. 8 illustrates user plane protocol stacks between a UE and a P-GW in accordance with the Control Plane CIoT EPS optimization.

FIG. 8 illustrates user plane protocol stacks between a UE and a P-GW in accordance with the Control Plane CIoT EPS optimization.

Referring to FIG. 8, GTP-u is a protocol which tunnels user data between the MME and S-GW as well as between the S-GW and P-GW in the backbone network. GTP encapsulates all end user IP packets. UDP/IP are the backbone network protocols used for routing user data and control signaling. NAS is the non-access stratum layer used to carry data between the UE and MME and may include header compression and security functions for user plane IP data.

The CIoT network or technology mainly provides communication services optimized for the IoT UE in terms of the core network, and the NB-IoT (narrowband Internet of Thing) network or technology optimizes the radio interface of the existing LTE technology for IoT.

As its name implies, the NB-IoT is a wireless technology that provides IoT services using a narrowband frequency of about 200 kHz. Compared to the conventional LTE technology using the minimum frequency band of about 1.25 MHz, the NB-IoT uses a very small frequency band. Therefore, the NB-IoT minimizes the processing power and power consumption of the UE.

The CIoT is a technology that minimizes the power consumption of the UE through the C-plane solution (that is, data is processed by the MME) or the U-plane solution (that is, even if the UE is in the RRC_IDLE state or a similar state, the UE and eNB maintains the context and use the context for the next connection in order to prevent the power consumption issue of the UE, which is caused because a number of messages are exchanged during the conventional attach (see section 5.3.2 at 3GPP TS 23.401) or service request procedure (see section 5.3.4 at 3GPP TS 23.401).

Therefore, the NB-IoT radio technology and CIoT technology can be applied separately. That is, even if the NB-IoT radio technology is not used, it is possible to apply the CIoT technology through the conventional LTE radio network. This means that the CIoT technology can be applied to UEs that cannot use the NB-IoT radio technology, for example, UEs already released with the LTE radio technology only. In addition, it means that conventional LTE radio technology based cells can support conventional LTE UEs such as smart phones while simultaneously supporting IoT UEs.

The S1 mode means that the UE uses the S1 interface between the radio access network and core network. In the S1 mode, the UE accesses network services via the E-UTRAN. In the multi-access system, the S1 mode is divided into the WB-S1 mode and the NB-S1 mode according to the current radio access network.

In the multi-access system, if the current serving E-UTRA provides the S1 mode in accordance with the NB-IoT, the system is considered to operate in the NB-S1 mode (see 3GPP TS 24.301, 3GPP TS 36.300, 3GPP TS 36.331, and 3GPP TS 36.306). In addition, in the multi-access system, if the system operates in the S1 mode rather than the NB-S1 mode, the system is considered to operate in the WB-S1 mode. In other words, the CIoT mode includes the WB-S1 and NB-S1 modes, and the NB-IoT corresponds to the NB-S1 mode. Except the NB-IoT, the rest of the CIoT except including the conventional LTE may correspond to the WB-S1 mode.

For design of a next-generation mobile network system, for example, a 5G core network, 3GPP has defined service requirements through a study entitled services and markets technology enablers (SMARTER). In addition, system architecture 2 (SA2) is conducting a study on architecture for a next generation system based on SMARTER.

Figure 9:
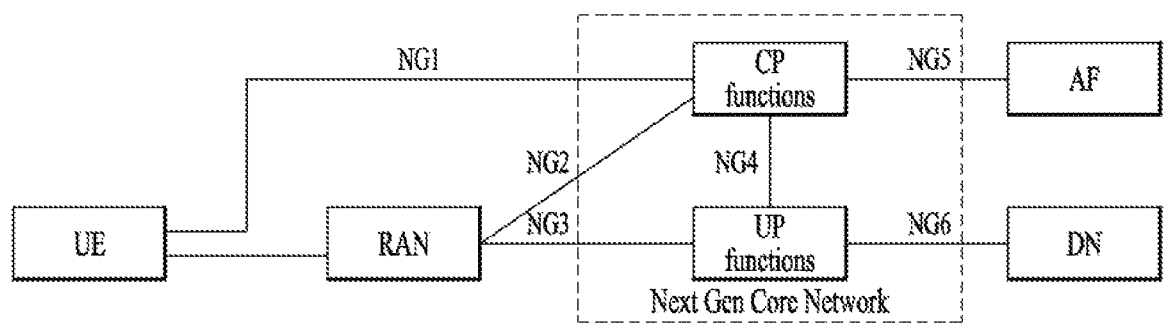
FIG. 9 illustrates a basic structure of a next-generation (hereinafter, NextGen) system, especially, an interface between main entities.

FIG. 9 illustrates a basic structure of a next-generation (hereinafter, NextGen) system, especially, an interface between main entities. In particular, FIG. 9 illustrates reference point naming of the NextGen system.

Depicted in FIG. 9 is a reference model of a potential architecture including potential functional entities and potential reference points with the intention that the naming in particular of the reference points may be used in individual solution proposals for a better understanding and comparison. This reference model does not make any assumption on the actual target architecture i.e. the target architecture may not have all of the depicted reference points or functional entities or may have additional/other reference points or functional entities.

In FIG. 9, the control plane (CP) functions and the user plane (UP) functions of the NextGen core are depicted as single boxes (CP functions and UP functions, respectively). Individual solution proposals may further split or replicate CP or UP functions. In that case the naming of additional reference point could add an index to the depicted reference point (e.g. NG4.1, NG4.2).

In FIG. 9, "RAN" refers to a radio access network based on the 5G RAT or Evolved E-UTRA that connects to the NextGen core network. The following reference points are illustrated in FIG. 9.

NG1: Reference point between the UE and the CP functions.

NG2: Reference point between the RAN and the CP functions.

NG3: Reference point between the RAN and the UP functions.

NG4: Reference point between the CP functions and the UP functions.

NG5: Reference point between the CP functions and an Application Function.

NG6: Reference point between the UP functions and a Data Network (DN).

Some reference points in FIG. 9 may consist of several reference points depending on how the CP functions and UP functions may be further split.

Figure 10:
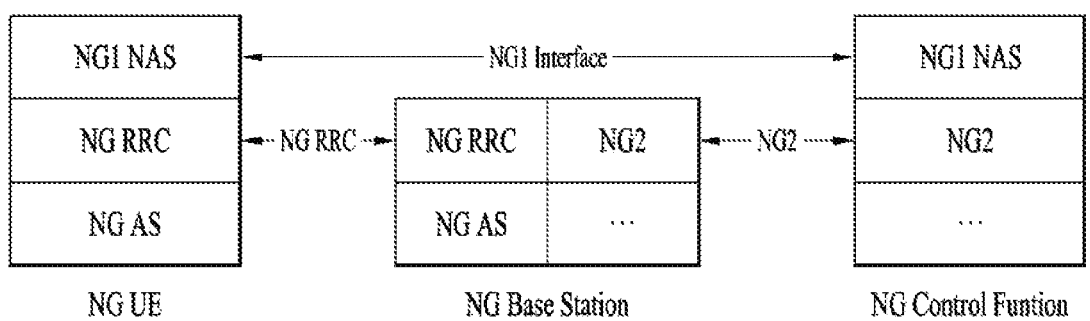
FIG. 10 illustrates a protocol stack between a UE and a core network considered in a NextGen system.

FIG. 10 illustrates a protocol stack between a UE and a core network considered in a NextGen system.

Referring to FIG. 10, NG1 performs a function similar to a NAS protocol of an EPS and NG2 performs a function similar to an S1-AP of the EPS. An NG RRC and an NG AS correspond respectively to a legacy LTE RRC and a legacy LTE AS or correspond respectively to a new radio (NR) RRC and an NR AS of NR which is newly achieving standardization. In two RATs supported in an NG system, i.e., in both LTE and NR, RRC is expected to be implemented based on current LTE RRC.

One of the techniques constituting a 5G system is network slicing. Requirements of network slicing have been defined by the next generation mobile networks (NGMN) alliance.

Figure 11:
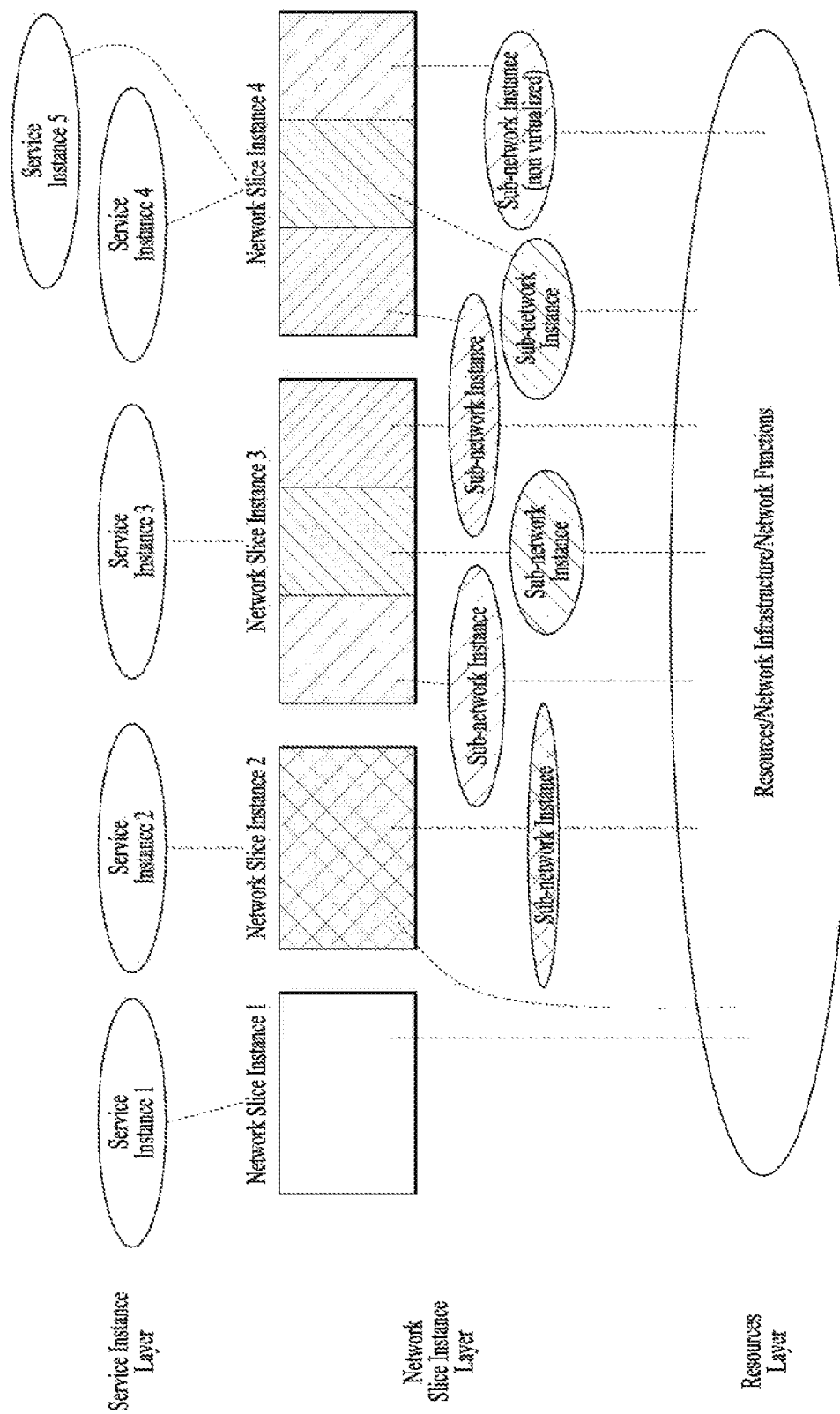
FIG. 11 illustrates a conceptual outline of network slicing.

FIG. 11 illustrates a conceptual outline of network slicing. The concept of network slicing according to the NGMN will now be described with reference to FIG. 11.

As shown in FIG. 11, the network slicing concept consists of 3 layers: 1) Service Instance Layer, 2) Network Slice Instance Layer, and 3) Resource layer.

The Service Instance Layer represents the services (end-user service or business services) which are to be supported. Each service is represented by a Service Instance. Typically services can be provided by the network operator or by 3rd parties. In line with this, a Service Instance can either represent an operator service or a 3rd party provided service.

A network operator uses a Network Slice Blueprint to create a Network Slice Instance. A Network Slice Instance provides the network characteristics which are required by a Service Instance. A Network Slice Instance may also be shared across multiple Service Instances provided by the network operator.

The Network Slice Instance may be composed by none, one or more Sub-network Instances, which may be shared by another Network Slice Instance. Similarly, the Sub-network Blueprint is used to create a Sub-network Instance to form a set of Network Functions, which run on the physical/logical resources. The definition for the terms shown in FIG. 11 is as follows.

Service Instance: An instance of an end-user service or a business service that is realized within or by a Network Slice.

Network Slice Instance: a set of network functions, and resources to run these network functions, forming a complete instantiated logical network to meet certain network characteristics required by the Service Instance(s).

A network slice instance may be fully or partly, logically and/or physically, isolated from another network slice instance.

The resources comprises of physical and logical resources.

A Network Slice Instance may be composed of Sub-network Instances, which as a special case may be shared by multiple network slice instances. The Network Slice Instance is defined by a Network Slice Blueprint.

Instance-specific policies and configurations are required when creating a Network Slice Instance.

Network characteristics examples are ultra-low-latency, ultra-reliability etc.

Network Slice Blueprint: A complete description of the structure, configuration and the plans/work flows for how to instantiate and control the Network Slice Instance during its life cycle. A Network Slice Blueprint enables the instantiation of a Network Slice, which provides certain network characteristics (e.g. ultra-low latency, ultra-reliability, value-added services for enterprises, etc.). A Network Slice Blueprint refers to required physical and logical resources and/or to Sub-network Blueprint(s).

Sub-network Instance: A Sub-network Instance comprises of a set of Network Functions and the resources for these Network Functions.

The Sub-network Instance is defined by a Sub-network Blueprint.

A Sub-network Instance is not required to form a complete logical network.

A Sub-network Instance may be shared by two or more Network Slices.

The resources comprises of physical and logical resources.

Sub-network Blueprint: A description of the structure (and contained components) and configuration of the Sub-network Instances and the plans/work flows for how to instantiate it. A Sub-network Blueprint refers to Physical and logical resources and may refer to other Sub-network Blueprints.

Physical resource: A physical asset for computation, storage or transport including radio access.

Network Functions are not regarded as Resources.

Logical Resource: Partition of a physical resource, or grouping of multiple physical resources dedicated to a Network Function or shared between a set of Network Functions.

Network Function (NF): Network Function refers to processing functions in a network.

This includes but is not limited to telecom nodes functionality, as well as switching functions e.g. Ethernet switching function, IP routing functions.

VNF is a virtualized version of a NF (refer to ETSI NFV for further details on VNF).

Based on the network slicing concept according to the NGMN, SA working group 1 (WG1) has defined potential requirements (PR) through work on SMARTER.

Unlike previous 3GPP systems that attempted to provide a 'one size fits all' system, the 5G system is expected to be able to simultaneously provide optimized support for different configurations through various means. Flexibility and adaptability on network functionality and service is a key distinguishing feature of a 5G system.

One key concept to achieve the goal of flexibility is network slicing. Network slicing allows the operator to provide dedicated logical networks with customer specific functionality, without losing the economies of scale of a common infrastructure. It allows services to be abstracted from the network resources. As such, a variety of use cases with diverging requirements can be fulfilled. For example, there will be different requirements on functionality such as charging, policy control, security, mobility etc. The use cases will also have differences in performance requirements e.g., lower latency, higher mobility and higher data rate. There is also a need to isolate the different slices from each other. Terminals can be directed to appropriate network slices at the same time in ways that fulfil operator or user needs, e.g., based on subscription, traffic (e.g., voice, data), or terminal type. Typically a set of end-user services are provided by one network slice of a mobile network operator. Some UEs can access more than one network slice simultaneously for services of more diverse characteristics, e.g., MBB and critical communication. When accessing more than one network slice simultaneously, the operator may choose to not duplicate certain signalling procedures. Network slices will consist of mainly 3GPP defined functions but could also include proprietary functions that are provided by different operators or $3^{rd}$ parties. To guarantee a consistent user experience and support of services in case of roaming, slices composed of the same network functions should be available for the user in the VPLMN. Configuration of network slices and provisioning of proprietary functions will be based on agreements between operators. Network slicing could also be used to provide a network configuration enabling basic communications (e.g., voice, text messages) in case of natural disasters. Another example of applying this concept could be to provide access to the network in markets where there is a need for providing access to essential services with a basic Internet access (e.g., basic broadband speeds, relaxed latency requirements). An operator often provides similar service to multiple $3^{rd}$ parties (e.g., enterprises) that require similar network functionalities, which should be supported in an efficient manner The 3GPP system shall allow the operator to compose and manage network slices. A network slice consists of a set of network functions (e.g., potentially from different vendors), the resources to run these network functions as well as policies and configurations.

The 3GPP system shall allow the operator to dynamically create a network slice to form a complete, autonomous and fully operational network customised for different market scenario.

The 3GPP system shall be able to associate specific services, devices, UEs, and subscribers with a particular network slice.

The 3GPP system shall enable a UE to simultaneously access services from one or more network slices of one operator e.g., based on subscription or terminal type.

The 3GPP system shall support mechanisms to enable the operator to operate and manage network slices that fulfil required criteria for different market scenarios.

The 3GPP system shall allow the operator to simultaneously operate network slices in a manner that prevents a service in one slice from negatively impacting services offered by other slices.

The 3GPP system shall have the capability to conform to service-specific security assurance requirements in a single network slice, rather than the whole network.

The 3GPP system shall have the capability to provide a level of isolation between network slices which confines a potential cyber-attack to a single network slice.

The 3GPP system shall allow the operator to authorize $3^{rd}$ parties to create and manage a network slice via suitable APIs, within the limits set by the network operator.

The 3GPP system shall support the elasticity of a network slice in terms of capacity with minimal impact on the services of this slice or other slices.

The 3GPP system shall be able to support modifications to network slices (e.g., adding, deleting, modifying network slices) with minimal impact to active subscriber services.

The 3GPP system shall be able to support E2E (e.g., RAN, CN) resource management in a network slice.

The 3GPP system shall enable operators to use the network slicing concept to efficiently support multiple $3^{rd}$ parties (e.g., enterprises) that require similar network characteristics.

The 3GPP system shall enable operators to define and identify network slices with common functionality to be available for home and roaming users.

The 3GPP system shall enable operators to specify the network functionalities that a network slice is required to provide.

The 3GPP system shall support the inclusion of 3GPP defined functions as well as proprietary $3^{rd}$ party or operator provided functions in a network slice, including:

Hosting multiple $3^{rd}$ parties (e.g., enterprises) or MVNOs;
Serving home and roaming use; and/or
Supporting diverse market scenarios.

The specific functional areas for which the system should support proprietary or operator provided functions should be identified.

The 3GPP system shall support a mechanism for the VPLMN to assign a UE to a network slice with the required functionality or to a default network slice.

The 3GPP system shall be able to change the network slices to which UEs are connected.

A network slice shall support a set of end-user services as defined by the network operator.

The 3GPP system shall enable the operator to assign a UE to a network slice based on services provided by the network slice.

The 3GPP system shall support a mechanism for an operator to authorize a UE to receive service on a specific slice in response to a request from a $3^{rd}$ party.

Meanwhile, based on service requirements of an NGMN and SA1, SA2 defines architectural requirements regarding an actual 5G system through a study entitled FS_NextGen. SA2 NextGen studies the following matters with respect to a network slice.

Network slicing enables the operator to create networks customised to provide optimized solutions for different market scenarios which demands diverse requirements, e.g. in the areas of functionality, performance and isolation. The network slice is a complete logical network (providing Telecommunication Services and Network Capabilities) including an access network (AN) and a core network (CN). In a legacy LTE system, an RAN or an E-UTRAN may correspond to the AN. The 5G system aims at supporting non-3GPP access as well at the same level as 3GPP access. A network supporting the non-3GPP access, as well as the RAN/E-UTRAN supporting the 3GPP access, may correspond to the AN. AN can be common to multiple network slices. A UE may provide network slice selection assistance information (NSSAI) consisting of a set of parameters to the network to select the set of RAN and CN part of the network slice instances (NSIs) for the UE. If a network deploys network slicing, then it may use UE provided network slice selection assistance information to select a network slice. A UE may access multiple slices simultaneously via a single RAN. In such case, those slices may share some control plane functions (e.g., mobility management). If UE obtained an UE temporary ID, the UE shall provide it to RAN during the RRC connection establishment, so that the NAS signalling messages transmitted over the RRC connection are routed to the Core network function instance identified by this temporary ID. UE provides the NSSAI info to the NextGen Core over NG1. The CN part of network slice instance(s) serving a UE is selected by CN not RAN.

Figure 12:
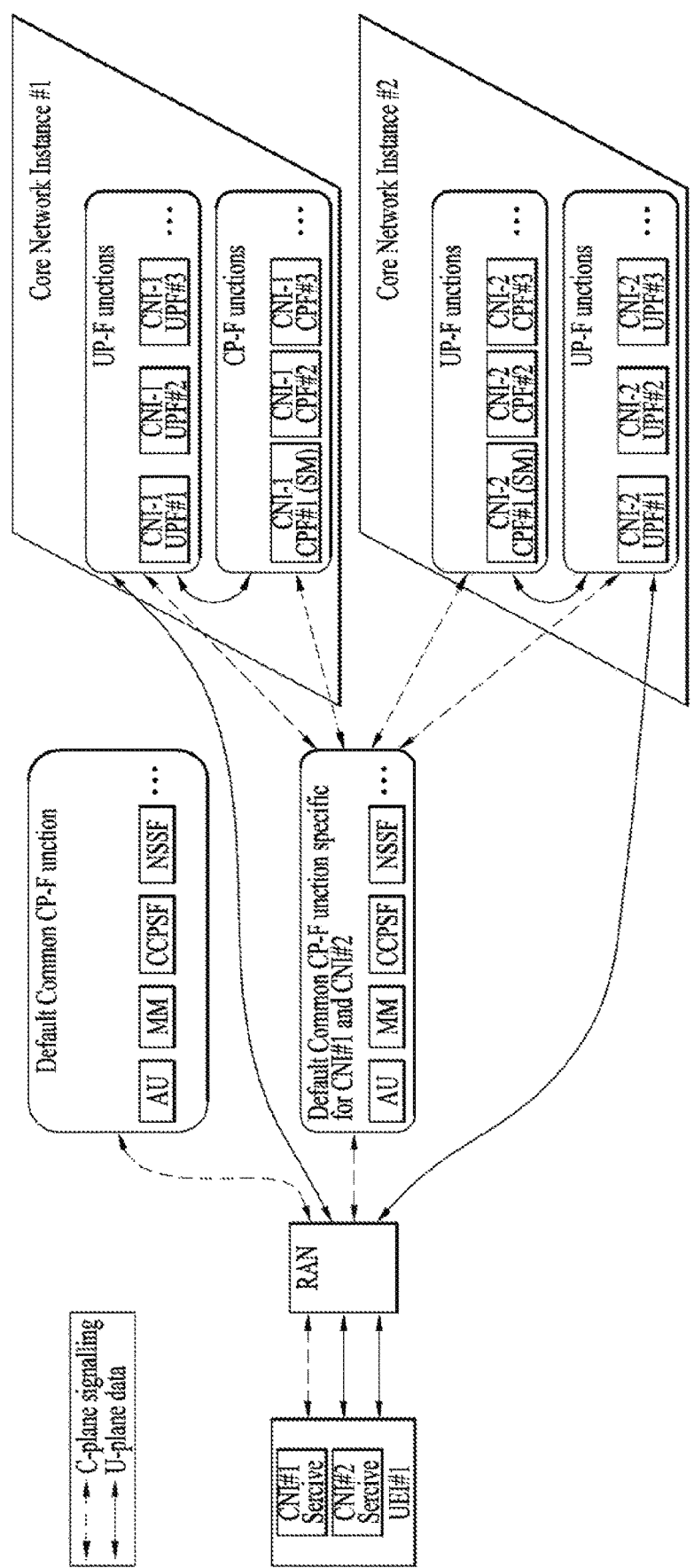
FIG. 12 illustrates the structure of currently considered network slicing.

FIG. 12 illustrates the structure of currently considered network slicing.

Referring to FIG. 12, one network slice or network slice instance includes a common part and a dedicated part. The common part is commonly present for one UE and the dedicated part is present in each slice.

When a UE uses NB-IoT and supports both CP optimization and UP optimization, or when a UE using LTE/E-UTRAN supports both CP optimization and UP optimization or supports at least CP optimization, the following situations may be considered. The UE exchanges a preferred/supported network behavior with a network through an attach procedure etc. so that the UE is set to use any one optimization. In this scenario, it is assumed that the UE uses CP optimization. The UE transmits data through an SRB without a DRB, using CP optimization to achieve a normal operation for transmitting infrequent small data. In the middle of data transmission, any event may occur and then the UE may need to transmit data having characteristics different from a conventional normal operation. For example, when it is necessary to transmit data which is too big to transmit through the SRB, it may be desirable or efficient for the UE to transmit the data through a path of UE-eNB-SGW, like the conventional operation, by transitioning to UP optimization instead of CP optimization or by generating a normal S1 bearer if the UE uses non-NB-IoT. When the UE is in an idle mode, for mobile originated (MO) data transport, the UE may transmit a service request to establish an S1 bearer and, for mobile terminated (MT) data transport, an MME may determine a path through which data is transmitted if the UE responds to a paging message.

However, current standardization does not specify an operation of transitioning to UP optimization or a normal E-RAB from CP optimization when the UE is in a connected state. When the UE seamlessly changes modes through an S1-AP initial context setup procedure etc. without deviating from the connected state, various problems may arise. For example, a NAS layer, rather than a PDCP layer, performs header compression in a CP optimization mode, and mode change of the UE may lead to a very complicated operation such as transfer of header compression information between layers. Similarly, a scenario in which a 5G UE in a connected state changes a network slice may be considered. Like the above-described problematic scenario, if change between slices involves an operation of passing a context without any conversion as in a legacy EPC operation, an independency or isolation principle between network slices, which is the most important characteristic among network slicing characteristics, may be damaged.

The present invention proposes a method of performing optimization between different modes or transition between core network functions without impact on other systems, through interaction between a network and a UE to which cellular IoT optimization is applied in a 3GPP universal mobile telecommunication system (UMTS)/evolved packet system (EPS) based mobile communication system. The present invention also proposes a method of rapidly performing a slice reselection procedure during application of network slicing in a 5G NextGen system.

<Inventive Proposal 1-1. Network Initiated CIoT Mode Transition in Connected Mode>

The present invention proposes a method of transitioning to a data path of UE-eNB-SGW by effectively transitioning to UP optimization or generating a normal E-RAB, when the UE uses CP optimization in a connected mode. Herein, generating the normal E-RAB refers to setting up both a DRB in an AS interface and a bearer of an S1-U interface. Even when the UE using CP optimization desires to use UP optimization in a connected mode, since a suspend/resume operation can be performed only after the E-RAB is established, the same procedure as the operation of creating the normal E-RAB is applied. Herein, UP optimization is used when both the UE and the network support UP optimization through negotiation about a network behavior in the attach procedure.

Figure 13:
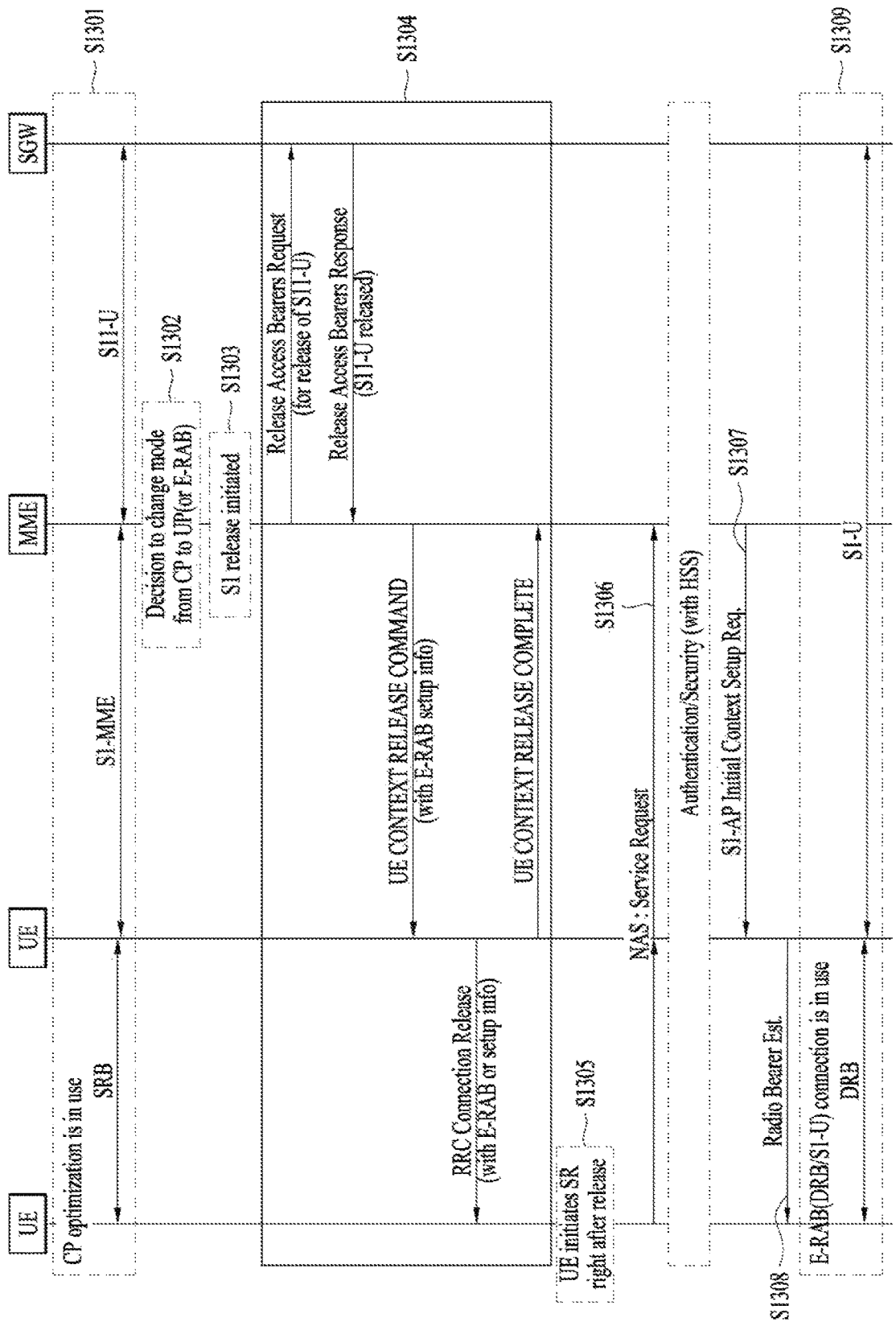
FIG. 13 illustrates an exemplary transition operation of a connection mode/type according to the present invention.

FIG. 13 illustrates an exemplary transition operation of a connection mode/type according to the present invention. Particularly, FIG. 13 illustrates an example of the present invention when a UE which is in a connected state in a CP optimization mode changes a connection mode/type to another mode.

Since the UE which is in a currently connected state uses CIoT optimization, an MME has an SRB for the UE instead of a bearer through an E-RAB or S1-U interface and is connected to an SGW through an S11-U interface (S1301). An event requiring mode change for the UE may occur. For example, MT data to be transmitted to the UE may occur, and the size of the MT data may be too big or inefficient to be transmitted using CP optimization in which the UE has already connected to the network. Alternatively, MO data may occur and it may take a long time for the UE to transmit the MO data or the MME may determine that the size of data that the UE currently transmits is big.

The MME may determine mode change based on the above-described criteria (S1302). For a UE supporting UP optimization, it may be necessary to set up the E-RAB in order to use UP optimization. Alternatively, for a UE which supports the S1-U interface but does not support UP optimization, it may be necessary to set up the E-RAB in order to use the normal S1-U interface. If the MME determines to change modes, the MME causes the UE to perform an S1 release procedure (S1303).

Through the S1 release procedure, the network releases all of an SRB for the UE and an S11-U connection (S1304). In this case, the MME may include an additional indication in a release command so that the UE may set up a bearer of an S1 interface by performing a service request immediately after the release procedure. Such an indication (hereinafter, an re-establishment indicator) indicating that a new E-RAB/S1-U bearer should be set up after the release procedure may be included in a UE context release command of an S1-AP interface as an additional information element (IE) or may be implemented using a method of adding a new cause value in an existing cause field as shown in Table 3. The UE context release command is a message that the MME transmits to an eNB so as to request release of a UE-associated S1-logical connection over the S1 interface.

Upon receiving the UE context release command, the eNB transmits an RRC connection release message to the UE unless an RRC connection has already been released. In the present invention, if an IE, a cause value, or an indication which indicates that a new E-RAB, S1-U bearer, or DRB should be generated after the release procedure is present in the UE context release command, the eNB includes a command similar thereto in the RRC connection release message and transmits the RRC connection release message to the UE. To this end, a new field may be added to the RRC connection release message or a new release cause value may be added to values usable as release causes.

An existing RRC connection release procedure releases an RRC connection by releasing established radio bearers as well as all radio resources. In the present invention, resource allocation to the UE may be maintained during RRC connection release according to implementations so that the UE may immediately transmit msg 3 of a random access procedure without transmitting an additional (random access) preamble. In this procedure, in order to maintain a dedicated channel (e.g., SRB connection) allocated to the UE, when a corresponding indication (e.g., a re-establishment indicator) is present, the UE and the eNB may omit transmission/reception of a preamble (RA msg 1)/response (RA msg 2) and an RRC connection request (RA msg 3)/RRC connection setup (RA msg 4) through an RACH procedure instead of releasing the dedicated channel and the UE may transmit a service request through an RRC connection setup complete (msg 5) message immediately after the connection release procedure. For example, when an SRB connection is maintained in the RRC connection release procedure, the UE may immediately transmit the RRC connection setup complete message without transmitting/receiving msg 1 to msg 4. When radio resources allocated to the UE are maintained, the UE may transmit msg 3 using the radio resources (immediately) after the RRC connection release procedure without transmitting an RA preamble and receiving an RAR. To cause the UE to immediately transmit the RRC connection setup complete message containing an RRC connection request or service request without transmitting the RA preamble and receiving the RAR, the eNB may include a UL grant containing UL resource allocation information in the RRC connection release message having the connection re-establishment indicator.

The UE initiates a service request immediately after completing the RRC connection release procedure (S1305) Immediately after completing the RRC connection release procedure, the UE transmits a NAS service request (S1306). Since all existing connections have been released, the UE needs to request a new RRC connection based on a PDCP capable of establishing, connecting, and managing the E-RAB in order to use a normal S1-U connection or UP CIoT. If a service request procedure is completed according to the service request procedure (refer to Section 5.3.4 of 3GPP 23.401) including an S1-AP initial context setup request (S1307) by the MME to the eNB and a radio bearer establishment request (S1308) to the UE by the eNB, the UE generates a DRB and an S1-U based UE-eNB-SGW connection (S1309) instead of a legacy SRB and S11-U based UE-eNB-MME-SGW connection. Upon receiving a release request message transmitted by the network, the UE decodes the release request message to confirm an indicator included in the release request message so that the UE can be aware of an optimization mode of a connection to be set up thereby. The UE may transmit different service request messages according to a CIoT optimization mode that the UE uses or the UE is to use. For example, when the UE transmits data using CP CIoT optimization, the UE transmits a CP service request without generating a DRB/S1-U. In the other cases, the UE may transmit a service request and generate the DRB/S1-U.

<Inventive Proposal 1-2. Network Slice Change with Fast Re-selection>

The method of rapidly reconfiguring a connection through the re-establishment indicator in the release procedure, proposed in Inventive Proposal 1-1, may also be applied to network slicing which is under discussion in a 5G core network. In particular, in a network slice reselection scenario, session deactivation with re-activation or detach with re-attach may be performed as a method of abandoning service continuity and maintaining isolation between slices.

When a slice to which the UE is connected needs to be changed, the network may transmit a session deactivation or detach message to the UE. Herein, for re-connection to a new slice, the network may include a slice change indicator for re-activation or re-attach together with a parameter and an ID indicating the new slice in the session deactivation or detach message. The slice change indicator may be included in a message of an NG2 interface corresponding to an A1-AP of an EPC or a message of an NG RRC interface or may be included in an NG1 NAS message.

Upon receiving the detach/deactivation message including the slice change indicator, the UE and the eNB immediately perform a re-activation/re-attach procedure without releasing a dedicated channel. When a UL grant procedure of the NG-RRC interface is similar to LTE RRC, the UE and the eNB may omit the preamble (RA msg 1)/response (RA msg 2) in a similar manner to Inventive Proposal 1-1 and the UE may transmit messages starting from the RRC connection request (RA msg 3). Alternatively, the UE and the eNB may omit up to the RRC connection request (RA msg 3) and/or the RRC connection setup (RA msg 4) and the UE may immediately transmit necessary messages (e.g., activation/attach request) through the RRC connection setup complete message (msg 5). To cause the UE to immediately transmit the RRC connection setup complete message including an RRC connection request or a request for re-activation or detach without transmitting the RA preamble and receiving the RAR, the eNB may include a UL grant containing UL resource allocation information in the session deactivation or detach message having the slice change indicator.

Figure 14:
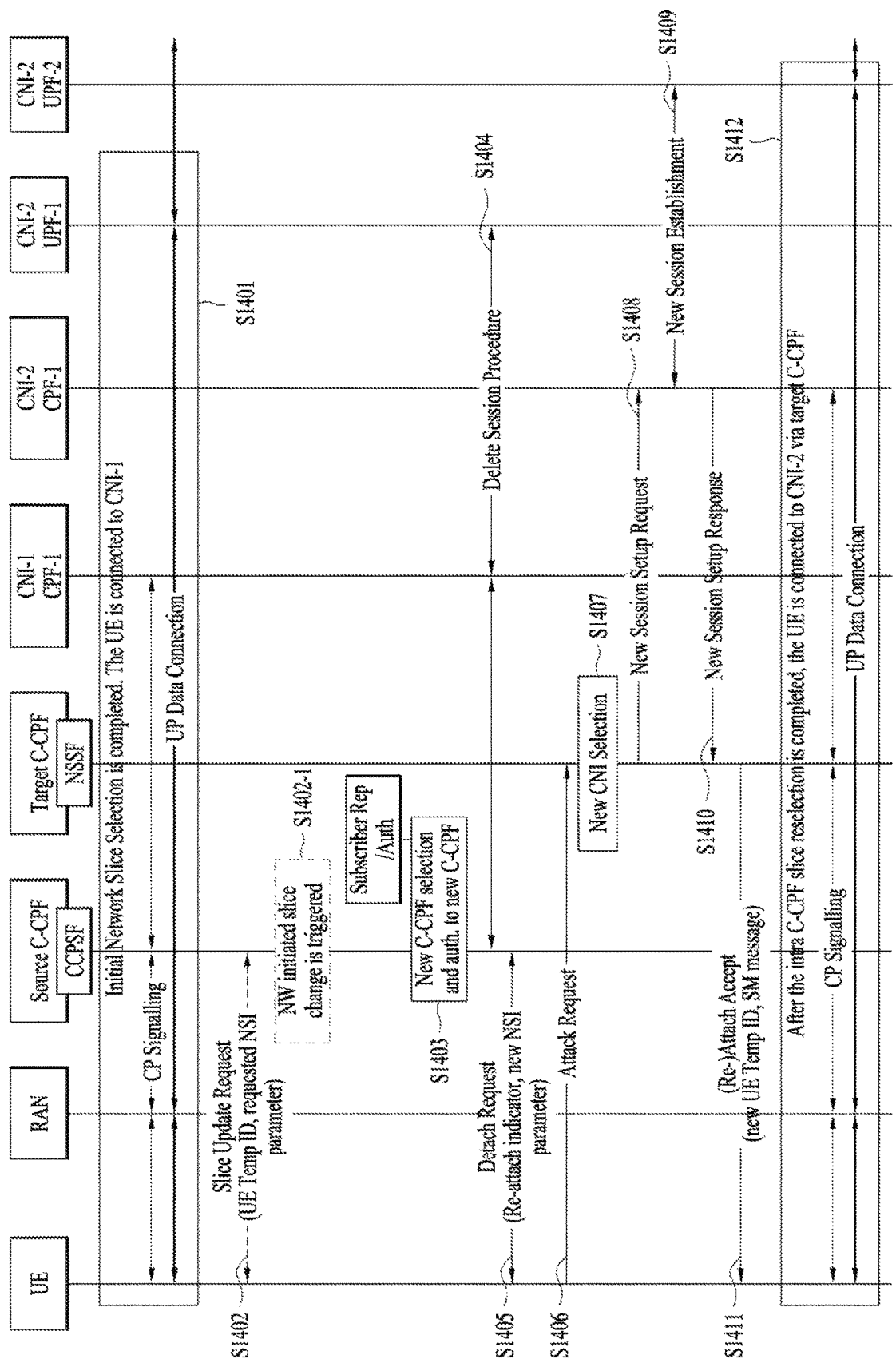
FIG. 14 illustrates another exemplary transition operation of a connection mode/type according to the present invention.

FIG. 14 illustrates another exemplary transition operation of a connection mode/type according to the present invention. In particular, FIG. 14 illustrates an intra-C-CPF network reselection procedure as an application example of the present invention when a mode/type of a network slice connection is changed (refer to Section 6.1.3 of 3GPP TR 23.799 v14.0.0). >S1401. After the initial selection for network slice (e.g. initial attach, new service request), the UE is connected to CNI-1 via initially selected C-CPF.

S1402. Due to some reasons specified in a standard document (e.g., section 6.1.8.2 of 3GPP TR 23.766 V14.0.0), the UE needs to change the network slice which the UE is connected. The UE may send Slice Update Request (current UE Temporary ID, requested NSI parameter) to the network. This request message may contain explicit new session request message or just may contain required parameters for new session setup.

S1402-1. Due to some reasons specified in a standard document (e.g., section 6.1.8.2 of 3GPP TR 23.766 V14.0.0), the network needs to change the network slice which the UE is connected.

S1403. NSSF or CCPSF in the source C-CPF performs slice reselection based on similar criteria for initial selection. If the serving C-CPF cannot accommodate the requested change of service, CCPSF can decide to change serving C-CPF and select new C-CPF. Then C-CPF interacts with the Subscriber Repository and/or authentication functions for authorizing the UE to the newly selected C-CPF. Authentication and/or Authorization for the target C-CPF may be skipped upon the operator's policy and the slice change scenario.

S1404. C-CPF performs Delete Session procedure with CPF and UPF in CNI-1. These steps may be conducted similar to session deactivation part of the detach procedure with re-attach in EPC according to 3GPP TS 23.401.

S1405. The source C-CPF sends detach request to the UE, which contains re-attach indicator and new NSI parameter if required.

In this procedure, a processor of a common CP function (C-CPF), which is a network entity, generates a detach message for slice change. In this case, an NG1 NAS message and an NG2 message carrying the NG1 NAS message may include the re-attach indicator defined in the present invention. When a result of interpreting, by the processor, the NG2 message received by a transceiver device of an NG RAN node requires detachment, an original message should be transmitted to the UE through the transceiver device and then a radio connection should be released. However, when the NG2 message includes the re-attach indicator, a normal radio connection release procedure may be omitted. Alternatively, a radio channel and resource which are currently allocated to the UE may be simply maintained for the UE.

When an RRC message received by a transceiver device of the UE or an NG1 NAS message interpreted by the processor is the detach message and when the re-attach indicator defined in the present invention is included, a processor of the UE processes the received detach message. In other words, the processor of the UE performs an operation based on the detach message. However, the UE does not release a radio connection which is typically performed. A transceiver device and a memory of the UE memorize and maintain a currently allocated channel (e.g., UL granted channel).

S1406. The UE deactivate the former PDU session and remove all the contexts with the source C-CPF. Then the UE sends attach request to the target C-CPF with the new NSI parameters.

The processor of the UE generates an attach request message for a new slice. The transceiver device of the UE transmits the attach request message through the (UL granted) radio channel memorized or maintained in S1405. The transceiver device of the NG RAN node processes the newly received message and then transmits the message to the network entity through an NG2 interface.

S1407. The target C-CPF selects the suitable CNI as per requested NSI parameters. The target C-CPF may fetch some part of the UE's context instead of fetching from the Subscriber Repository.

S1408~S1410. C-CPF sets up a new PDU session to the selected CNI in S1407.

S1411. After the session setup is completed, the network sends Attach Accept message to the UE. This may contains new UE Temp ID, if changed, and piggybacked SM message (new session ID, new DNN) for notifying completion of session setups.

S1412. After the inter C-CPF slice reselection procedure is completed, the UE is connected to new CNI via new C-CPF.

According to the present invention described in Inventive Proposal 1-1 and Inventive Proposal 1-2, the UE can change a mode or type of a connection with the network while maintaining a connected state. Since some messages of the RA procedure are omitted, the mode/type of the connection can be rapidly changed.

In the present invention, the eNB may be simultaneously connected to both a legacy LTE core network and a NextGen core network.

Figure 15:
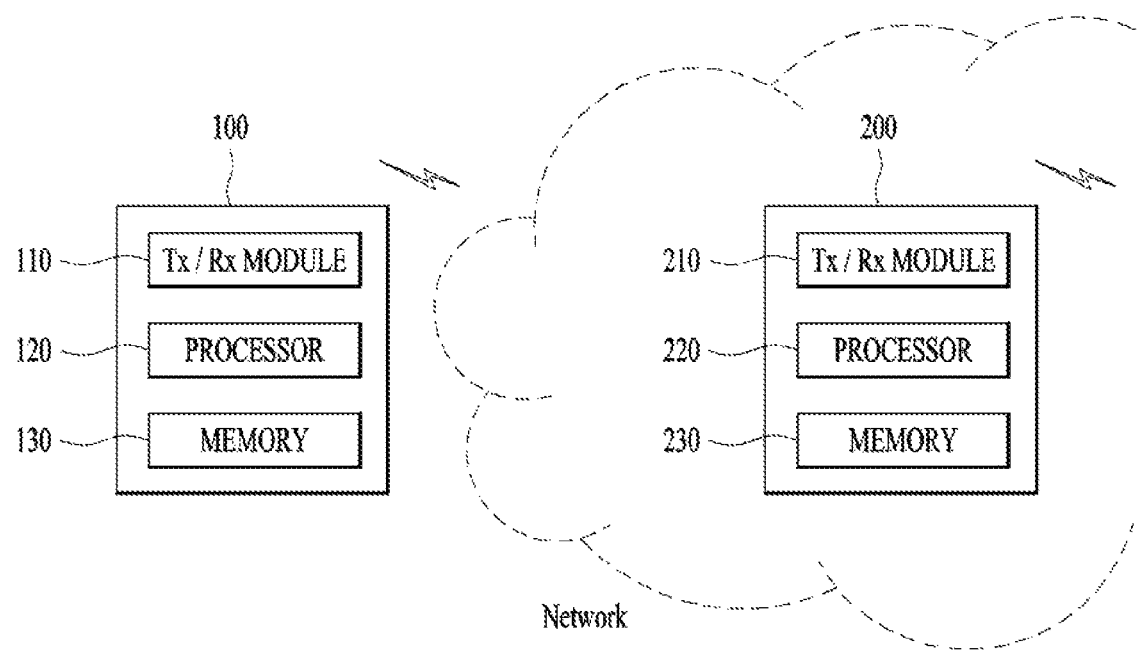
FIG. 15 illustrates a node according to an example of the present invention.

FIG. 15 illustrates configuration of a UE and a network node according to a preferred implementation example of the present invention.

The UE 100 according to the present invention may include a transceiver 110, a processor 120, and a memory 130. The transceiver 110 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 15, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various examples of the present invention may be independently applied or implemented such that two or more examples are simultaneously applied. For simplicity, redundant description is omitted.

The examples of the present invention may be implemented through various means. For example, the examples may be implemented by hardware, firmware, software, or a combination thereof.

When implemented by hardware, a method according to examples of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to examples of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred examples of the present invention has been given to enable those skilled in the art to implement and practice the invention. Although the invention has been described with reference to exemplary examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

What is claimed is:

1. A method of changing a connection mode by a base station (BS), the method comprising:
receiving a connection re-establishment indication together with a connection release command for a user equipment (UE) from a core network;
transmitting a connection release message including information on the connection re-establishment indication to the user equipment having a connection of a first mode;
releasing the connection of the first mode from the UE while maintaining an uplink resource allocated to the UE; and
receiving a connection request through the uplink resource without a random access procedure after releasing the connection of the first mode.

2. The method according to claim 1, further comprising:
establishing a connection of a second mode different from the first mode with the UE.

3. The method according to claim 2,
wherein the connection release message is for changing a network slice, and the first mode and the second mode are different network slices.

4. The method according to claim 3,
wherein the connection release message is for changing a cellular Internet of things (CIoT) optimization mode, the first mode is a control plane CIoT optimization mode, and the second mode is a user plane CIoT optimization mode.

5. The method according to claim 1,
wherein the connection release message includes allocation information on the uplink resource.

6. A base station (BS) for changing a connection mode, the BS comprising,
a transceiver, and
a processor configured to control the transceiver, the processor configured to:
control the transceiver to receive a connection re-establishment indication together with a connection release command for a user equipment (UE) from a core network;
control the transceiver to transmit a connection release message including information on the connection re-establishment indication to the UE having a connection of a first mode;
release the connection of the first mode from the UE while maintaining an uplink resource allocated to the UE; and
control the transceiver to receive a connection request through the uplink resource without a random access procedure after releasing the connection of the first mode.

7. The BS according to claim 6, wherein the processor establishes a connection of a second mode different from the first mode with the UE.

8. The BS according to claim 7,
wherein the connection release message is for changing a network slice, and the first mode and the second mode are different network slices.

9. The BS according to claim 8,
wherein the connection release message is for changing a cellular Internet of things (CIoT) optimization mode, the first mode is a control plane CIoT optimization mode, and the second mode is a user plane CIoT optimization mode.

10. The BS according to claim 9,
wherein the connection release message includes allocation information on the uplink resource.

11. A method of changing a connection mode by a user equipment (UE), the method comprising:
receiving a connection release message including information on a connection re-establishment indication from a network through a connection of a first mode;
releasing the connection of the first mode while maintaining an uplink resource allocated to the UE; and
transmitting a connection request to the network through the uplink resource without a random access procedure after releasing the connection of the first mode.

12. The method according to claim 11, further comprising:
establishing a connection of a second mode different from the first mode with the network.

13. The method according to claim 12,
wherein the connection release message is for changing a network slice, and the first mode and the second mode are different network slices.

14. The method according to claim 13,
wherein the connection release message is for changing a cellular Internet of things (CIoT) optimization mode, the first mode is a control plane CIoT optimization mode, and the second mode is a user plane CIoT optimization mode.

15. The method according to claim 11,
wherein the connection release message includes allocation information on the uplink resource.

16. A user equipment (UE) for changing a connection mode, the UE comprising,
a transceiver, and
a processor configured to control the transceiver, the processor configured to:
control the transceiver to receive a connection release message including information on a connection re-establishment indication from a network through a connection of a first mode;
release the connection of the first mode while maintaining an uplink resource allocated to the UE; and
control the transceiver to transmit a connection request to the network through the uplink resource without a random access procedure after releasing the connection of the first mode.

17. The UE according to claim 16,
wherein the processor establishes a connection of a second mode different from the first mode with the network.

18. The UE according to claim 17,
wherein the connection release message is for changing a network slice, and the first mode and the second mode are different network slices.

19. The UE according to claim 18,
wherein the connection release message is for changing a cellular Internet of things (CIoT) optimization mode, the first mode is a control plane CIoT optimization mode, and the second mode is a user plane CIoT optimization mode.

20. The UE according to claim 16,
wherein the connection release message includes allocation information on the uplink resources.

* * * * *